(12) United States Patent
Sakoske et al.

(10) Patent No.: US 7,265,069 B2
(45) Date of Patent: Sep. 4, 2007

(54) FOREHEARTH CONCENTRATE AND METHOD FOR OPALIZATION OF GLASS

(75) Inventors: George E. Sakoske, Washington, PA (US); Kenneth R. Ackerman, Wooster, OH (US); John M. Bauer, Canton, OH (US)

(73) Assignee: Ferro Corporation, Cleveland, OH (US)

( * ) Notice: Subject to any disclaimer, the term of this patent is extended or adjusted under 35 U.S.C. 154(b) by 79 days.

(21) Appl. No.: 11/211,133

(22) Filed: Aug. 24, 2005

(65) Prior Publication Data

US 2007/0054793 A1 Mar. 8, 2007

(51) Int. Cl.
*C03C 6/00* (2006.01)
*C03C 6/06* (2006.01)
*C03C 6/08* (2006.01)

(52) U.S. Cl. ............................ 501/27; 501/29; 501/30

(58) Field of Classification Search ............ 501/27–31; 65/134.3, 135.9
See application file for complete search history.

(56) References Cited

U.S. PATENT DOCUMENTS

| 3,958,973 | A | 5/1976 | Roberts |
| 4,427,429 | A | 1/1984 | Tiilikka |
| 5,153,150 | A | 10/1992 | Ruderer et al. |
| 5,208,191 | A | 5/1993 | Ruderer et al. |
| 5,350,718 | A | 9/1994 | Anquetil et al. |
| 5,618,764 | A * | 4/1997 | Usui et al. ..................... 501/17 |
| 5,817,586 | A * | 10/1998 | Harada et al. ................. 501/17 |
| 6,207,285 | B1 | 3/2001 | Sakoske et al. |
| 6,287,996 | B1 * | 9/2001 | Chiba et al. ................... 501/17 |
| 6,624,104 | B2 | 9/2003 | Sakoske et al. |
| 6,905,990 | B2 * | 6/2005 | Sanichi et al. ................ 501/32 |
| 2005/0020429 | A1 | 1/2005 | Ackerman |

* cited by examiner

*Primary Examiner*—Karl Group
(74) *Attorney, Agent, or Firm*—Rankin, Hill, Porter & Clark LLP

(57) ABSTRACT

The invention provides an opalescent forehearth color concentrate comprising a non-smelted agglomerated interspersion of particles for use in coloring glass, said concentrate comprising by weight from about 10% to about 70% of a glass component and from about 30% to about 90% of one or more opalescent pigments, the glass component comprising by weight from about 10% to about 50% ZnO and about 15 to about 60% $SiO_2$. The invention also provides a method of using the color concentrate.

9 Claims, No Drawings

FOREHEARTH CONCENTRATE AND METHOD FOR OPALIZATION OF GLASS

BACKGROUND OF THE INVENTION

1. Field of Invention

The present invention relates to the field of forehearth concentrates for use in opalescent glass compositions. In particular, the present invention provides a new and improved opalescent forehearth concentrate comprising a non-smelted agglomerated interspersion for forming opalescent glass in the forehearth of a glass furnace, and a method of using the opalescent concentrate. The invention further provides a novel glass composition for use in forming the opalescent concentrate or for use directly in a forehearth.

2. Description of Related Art

Prior art methods of opalization of glass have required high concentrations of opalescent pigment, e.g., greater than 1 0% to as much as 20% of the overall glass composition, as well as low temperatures and long furnace cycle times to allow striking (nucleation) of the opalescent crystalline additives.

The manufacture of opalescent glass in a forehearth furnace by the addition of either: (i) an opalescent enriched glass frit, or (ii) an opalescent forehearth concentrate comprising a non-smelted compacted interspersion, to a molten clear or colorless base glass is well known. In such processes, the opalescent enriched glass frit or opalescent forehearth concentrate is added to the molten glass flowing through the forehearth of a furnace. This process makes possible the manufacture of both one or more opalescent glass items and clear/colorless glass items from a single melting furnace equipped with multiple forehearths. In the forehearth opalization process, the glass frit or opalescent forehearth concentrate is metered into the molten base glass after the base glass flows from the refining zone or distributor of the furnace and into the forehearth.

Opalescent forehearth concentrates are commonly used in many applications instead of opalescent glass frits because in many applications opalescent concentrates can provide better dispersion of the desired opalescent and avoid the formation of unwanted inclusions and specks in the final opalescent glass product.

BRIEF SUMMARY OF THE INVENTION

The present invention provides a opalescent forehearth concentrate that contains a high loading of opalescent pigment that can be quickly and completely dispersed and dissolved when added to the molten base glass of a forehearth furnace at conventional commercial molten glass temperatures. Accordingly, the concentrate can be used at a lower loading (less than about 10 wt %) in the final glass composition relative to the prior art. Use of the opalescent forehearth concentrate of the present invention leads to a uniform dispersion of opalescent pigment with the glass becoming opalescent. The invention further provides methods of using the glass frit and opalescent concentrate, and a method for forming an agglomerated opalescent concentrate.

Broadly, the opalescent forehearth concentrate comprises a non-smelted agglomerated interspersion of particles for use in opalizing molten glass, the concentrate comprising by weight from about 10% to about 70% of a glass component and from about 30% to about 90% of one or more opalescent pigments. The glass component may further comprise by weight from about 10% to about 65% of one or more seed materials.

A method for opalizing a molten base glass in the forehearth of a glass furnace in accordance with the present invention comprises the steps of: (i) forming an opalescent concentrate comprising a non-smelted agglomerated interspersion of particles, the concentrate comprising by weight from about 10% to about 70% of a glass component and from about 30% to about 90% of one or more opalescent pigments, the glass component comprising by weight from about 10% to about 50% ZnO and about 15 to about 60% $SiO_2$; (ii) adding the opalescent concentrate to the molten glass contained in a forehearth so as to impart opalescence to the molten glass; and (iii) cooling the molten glass to form an opalescent glass composition.

In another embodiment the invention provides a method of forming an agglomerated opalescent forehearth concentrate for use in opalizing glass comprising a non-smelted interspersion of particles formed by the steps of: (i) providing a powdered glass composition comprising by weight from about 30% to about 90% of one or more opalescent pigments; (ii) providing a binder; (iii) thoroughly mixing the glass composition and the binder to form a mixture; and (iv) compacting the mixture to form the opalescent forehearth concentrate.

The present invention provides an opalescent forehearth concentrate to provide opal effects to mass produced glasses. The concentrate may be used at percentages of less than 10%, and will not require extended time reduced temperature striking of the base glass to produce the opal opalescent effects.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

In the manufacturing of opalescent glasses it is well known that the opalescent pigments can be added to a forehearth, which is situated between a furnace and an automatic forming machine. The object of the present invention is to add forehearth concentrates of opalizing compounds that contain high proportions of fluorine and/or phosphate as well as additives such as alumina, sulfur, titania, zinc oxide, boron oxide, zirconium oxide, sodium oxide, calcium oxide, and magnesium oxide. In addition, specific crystallizing seed materials such as zinc silicate, zirconium silicate, zinc titanate, zinc borate, and others can be included in the concentrate to act as rapid nucleating agents to eliminate long times at low temperatures for striking (nucleation) of desired opalescent crystalline compounds.

The inventors herein have found that the use of refractory metal salts, which contain high proportions of fluorine, phosphate, or combinations of fluorine and phosphate, can produce opalescent effects in glasses without the need for long furnace cycle times and low firing temperatures. The refractory metal salts preferably have a melting point (mp) of at least about 1100° C., preferably at least about 1200° C.

One or more low melting frits can be added to counter the refractory nature of high temperature additives so that suitable working viscosities of the final glass composition can be realized. Preferably, such low melting frits have a melting point of less than about 900° C. Additionally, colorant metals such as manganese, chromium, cobalt, copper, vanadium, selenium, nickel, molybdenum, tungsten, niobium, as well as oxides and mixed metal oxides of the foregoing can be added to further develop color and/or opalescence.

Broadly, the opalescent forehearth concentrate comprises a non-smelted agglomerated interspersion of particles for use in opalizing molten glass, the concentrate comprising by weight from about 10% to about 70% of a glass component and from about 30% to about 90% of one or more opalescent pigments. The glass component may further comprise by weight from about 10% to about 65% of one or more seed materials. All compositional percentages herein are by weight and are given for a blend prior to firing. All percentages, temperatures, times, particle sizes and ranges of other values are presumed to be accompanied by the modifier "about." Details on each component and ingredient follow.

Glass Component. The glass component, which comprises reactive glass frits, comprises about 10-70% of the opalescent forehearth concentrate composition. The reactive frits may contain oxide frits, sulfide frits or combinations thereof. Suitable oxide frits include borosilicate frits, for example, bismuth borosilicate frits and zinc borosilicate frits. More details on suitable frits may be found in commonly owned U.S. Pat. No. 5,153,150 (Ruderer et al.) and U.S. Pat. No. 6,207,285 (Sakoske et al.), both of which are incorporated by reference herein. Representative oxide frits and sulfide frits useful in the present invention have the compositions, prior to firing, shown in Table 1.

TABLE 1

Oxide and Sulfide Frit Compositions.
Ingredients in weight percent.

| Component | Oxide Frit | Oxide Frit Preferred | Sulfide Frit |
|---|---|---|---|
| $SiO_2$ | 10-65 | 30-45 | 19-39 |
| ZnO | 0-50 | 15-40 | 32-34 |
| $B_2O_3$ | 0-40 | 4-18 | 11-22 |
| $Na_2O$ | 0-40 | 8-22 | 9-12 |
| $TiO_2$ | 0-5 | 0-3 | 2-4 |
| $Al_2O_3$ | 0-5 | 0-1 | 0-3 |
| $ZrO_2$ | 0-8 | 0.1-5 | 0-5 |
| $K_2O$ | 0-25 | 1-9 | 0-1 |
| $F_2$ | 0-15 | 0.1-5 | 0-5 |
| S | | | 0.1-3 |

Commercial examples of useful oxide frits herein include those available from the Ferro Corporation, Washington, Pa., such as zinc-containing frits E-8012, RD-2012, PD997, GAL1943, and RD-2060. If desired, the glass component can comprise a blend of two or more glass frits that, in combination, provide the same general composition by weight as shown above.

In one embodiment the glass frit for use in either forming an agglomerated opalescent forehearth concentrate or for use as a direct addition to a forehearth furnace comprises by weight from about 0% to about 40% $Na_2O$, from about 10% to about 65% SiO2, from about 0% to about 25% $B_2O_3$, from about 0% to about 25% $K_2O$, from about 0% to about 5% $Li_2O$, from about 0% to about 5% $Al_2O_3$, from about 0% to about 5% $TiO_2$, and from about 0% to about 15% $F_2$. In a preferred embodiment, any or all of the foregoing ranges having a lower bound of zero may be bounded by 0.1% instead.

As can be seen above, the composition of the glass frits are not critical. Each frit composition may additionally contain glass-modifying ingredients comprising oxides or sulfides or combinations of oxides and sulfides as known in the art. Exemplary glass modifying oxides include $TiO_2$, $ZrO_2$, $Al_2O_3$, $K_2O$, $Li_2O$, $Na_2O$, $F_2$, $Nb_2O_5$, $CeO_2$, $Sb_2O_3$, BaO, CaO, SrO, MgO, SnO, $Cr_2O_3$, $Bi_2O_3$, NiO, CoO, oxides of manganese, for example MnO or $Mn_2O_3$, oxides of iron, for example $Fe_2O_3$ or FeO, oxides of copper, for example CuO or $Cu_2O$, oxides of molybdenum, for example MoO or $Mo_2O_3$, oxides of tungsten, for example $WO_3$ or $WO_2$. Oxides of different oxidation states of the aforementioned metals are also envisioned. Also envisioned are glass frits, which intentionally include PbO and/or CdO, or frits which intentionally exclude them, depending on desired performance and environmental considerations.

Broadly, useful amounts of such additional oxides include 0-10% $TiO_2$, 0-7% $ZrO_2$, 0-7% $Al_2O_3$, 0-10% $K_2O$, 0-5% $Li_2O$, 0-15% $Na_2O$, 1-7%, $F_2$, 0-4% $Nb_2O_5$, 0-4% $CeO_2$, 0-4% $Sb_2O_3$, 0-20% BaO, 0-20% CaO, 0-20% SrO, 0-10% MgO, 0-20% SnO, 0-10% $Cr_2O_3$, 0-8% NiO, 0-10% CoO, 0-25% oxides of manganese, 0-20% oxides of iron 0-10% oxides of copper, 0-4% oxides of molybdenum, and 0-5% oxides of tungsten. Preferably, each range in this paragraph has a lower bound of 0.1% instead of zero.

Sulfide glass frits are glass frits that contain a metal sulfide component. Sulfide glass frits useful herein are disclosed in U.S. Pat. No. 5,350,718 (Antequil et al.), which is hereby incorporated by reference. Exemplary sulfides in such frits include ZnS, MnS, FeS, CoS, NiS, $Cu_2S$, CdS, $Sb_2S_3$ and $Bi_2S_3$. Preferably, the sulfide is ZnS. A glass component containing both oxide and sulfide frits are also envisioned. The glass frits useful herein have a melting point in the range of about 450° C. to about 750° C., or any intermediate temperature such as 500° C., 550° C., 580° C., 600° C., 630° C., 650° C., 680° C., or 700° C., and various of the frits may be effectively fired at those temperatures.

The term "coloring oxides" refers to any one or more of the following oxides selected from the group consisting of $Cr_2O_3$, CoO, $Co_3O_4$, CuO, $Fe_2O_3$, $MnO_2$, NiO, and $V_2O_5$. Any one or a mixture of several coloring oxides can be included as part of the glass frit(s), but the sum of all coloring oxides should not exceed about 10 percent by weight of the glass composition. Coloring oxides are used in minor amounts to adjust the final opalescent and tint of the opalescent glass.

The glass frits are formed in a known manner, for example, blending the starting materials (oxides and/or sulfides) and melting together at a temperature of about 1000-1300° C. for about 40 minutes to form a molten glass having the desired composition. The molten glass formed can then be suddenly cooled in a known manner (e.g., water quenched) to form a frit. The frit can then be ground using conventional milling techniques to a fine particle size, from about 1 to about 8 microns, preferably 2 to about 6 microns, and more preferably about 3 to about 5 microns.

Opalescent Pigments. Metal salts comprising phosphate ions and/or fluoride ions function as opalescent pigments in the forehearth concentrate of the invention. The metal salts advantageously have melting point of at least 1200° C. Metal salts envisioned in the opalescent forehearth concentrates herein include $AlF_3$, $Al(PO_3)_3$, $AlPO_4$, $CaF_2$, $MgF_2$, $SrF_2$, $BaF_2$, NaF, KF, and RbF. Preferably, the metal salts used herein as opalescent pigments are $AlF_3$ and $Al(PO_3)_3$ and combinations thereof.

Color Pigments. A conventional colorizing or opacifying pigment may also be included in the opalescent forehearth concentrate. Typical mixed metal oxide pigments used to produce black colors include oxides of copper, chromium, iron, cobalt, nickel, manganese, and other transition metals. The opalescent forehearth concentrate may further comprise about 10 to about 40% of conventional color or opacifying pigment depending upon the range of color, gloss, and opacity desired, in addition to opalescence. Useful color pigments may come from several of the major classifications of complex inorganic pigments, including corundum-hematite, olivine, priderite, pyrochlore, rutile, and spinel, though other categories such as baddeleyite, borate, garnet, periclase, phenacite, phosphate, sphene and zircon may be suitable in certain applications. For example, cobalt silicate blue olivine $Co_2SiO_4$; nickel barium titanium primrose priderite $2NiO:3BaO:17TiO_2$; lead antimonite yellow pyrochlore $Pb_2Sb_2O_7$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O_2$; cobalt aluminate blue spinel $CoAl_2O_4$; zinc chrome cobalt aluminum spinel $(Zn,Co)(Cr,Al)_2O_4$; cobalt chromate blue-green spinel $CoCr_2O_4$; cobalt titanate green spinel $Co_2TiO_4$; iron chromite brown spinel $Fe(Fe,Cr)_2O_4$; iron titanium brown spinel $Fe_2TiO_4$; nickel ferrite brown spinel $NiFe2O_4$; zinc ferrite brown spinel $(Zn,Fe)Fe_2O_4$; zinc iron chromite brown spinel $(Zn,Fe)(Fe,Cr)_2O_4$; copper chromite black spinel $CuCr_2O_4$; iron cobalt chromite black spinel $(Co,Fe)(Fe,Cr)_2O_4$; chrome iron manganese brown spinel $(Fe,Mn)(Cr,Fe)_2O_4$; chrome iron nickel black spinel $(Ni,Fe)(Cr,Fe)_2O_4$; and chrome manganese zinc brown spinel $(Zn,Mn)(Cr_2O_4)$.

The opalescent forehearth concentrate compositions of the invention may also contain up to about 15% of one or more fillers such as silica and alumina, and other conventional additives, such as iron, silicon, zinc and the like to enhance desired properties. The filler may alternately be refractory oxide fillers such as boro-alumina-silicates, alumina-silicates, calcium silicates, soda-calcia-alumina-silicates, wollastonite, feldspar, titanates, and combinations thereof. Refractory fillers may be advantageously used to adjust the melting point of a final opalescent glass composition by offsetting lower melt points of certain glass frits used therein.

Seed Material. The enamel compositions may optionally contain up to about 20% (e.g., 0.1-20% or 2-10%) of a seed material such as bismuth borosilicates, bismuth silicates, bismuth titanates, calcium silicates, zinc borosilicates, and zinc silicates. The seed materials may include, without limitation, $Zn_2SiO_4$, $Bi_{12}SiO_{20}$, $Bi_4(SiO_4)_3$, $Bi_2SiO_5$, $2ZnO.3TiO_2$, $Bi_2O_3.SiO_2$, $Bi_2O_3.2TiO_2$, $2Bi_2O_3.3TiO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, and $Bi_2Ti_4O_{11}$. U.S. Pat. No. 6,624,104 (Sakoske et al.) and U.S. Pat. No. 5,208,191 (Ruderer, et al.) provide further information on seed material; both patents are commonly owned herewith and incorporated by reference.

The frit or frits comprising the glass component can be formed by conventional methods. Preferably, selected oxides are smelted in a rotary smelter and then the molten glass is converted to frit using water-cooled rollers.

Binder. The binder used in the opalescent forehearth concentrates according to the present invention can be any substance that is compatible with the base glass being opalescent and does not interfere with dispersion of the glass component. The binder helps hold the non-smelted agglomerated interspersion of glass frit(s) and binder particles together until they are added to the base glass in the forehearth. Once the opalescent forehearth concentrates have been added to the base glass being opalescent, the binder locally and temporarily reduces the fusion temperature between the glass component and the base glass for a time sufficient to permit a rapid and thorough dispersion of the glass frit(s) through the base glass. The binder also disperses throughout the base glass and becomes diluted to the point that it does not alter the basic characteristics of the base glass.

Preferred binders for use in the invention comprise one or more materials selected from the group consisting of alkali borates, boric acid, alkali phosphates, orthophosphoric acid, alkali silicates, fluorosilicic acid, alkali fluorides, alkali salts, alkali hydroxides and mixtures. Suitable alkali cations include the alkali metals such as sodium, potassium and lithium and the alkaline earth metals such as calcium, magnesium and barium.

Suitable alkali borates that can be employed as binders in the invention include borax, potassium pentaborate, potassium metaborate, potassium tetraborate, and calcium borate. Among the alkali phosphates which can be employed are hemisodium phosphate, monosodium phosphate, disodium phosphate, trisodium phosphate, monopotassium phosphate, dipotassium phosphate, tripotassium phosphate, monoammonium phosphate, diammonium phosphate, monocalcium phosphate, dicalcium phosphate, tricalcium phosphate, sodium acid pyrophosphate, tetrasodium pyrophosphate, tetrapotassium pyrophosphate, calcium pyrophosphate, sodium tripolyphosphate, potassium tripolyphosphate, calcium tripolyphosphate, potassium metaphosphate, sodium trimetaphosphate, sodium monofluorophosphate, calcium monofluorophosphate and sodium tetrametaphosphate. Suitable alkali silicates include sodium silicate, potassium silicate, sodium fluorosilicate and calcium fluorosilicate. Suitable alkali fluorides include sodium aluminum fluoride, calcium fluoride, lithium fluoride, anhydrous potassium fluoride, potassium fluoride dihydrate, potassium bifluoride and sodium fluoride. Suitable alkali salts include sodium carbonate and barium carbonate. Suitable alkali hydroxides include sodium hydroxide, lithium hydroxide and potassium hydroxide.

The preferred binders however are the alkali silicates formed from alkali metals such as potassium, lithium and sodium. The alkali metal silicates are preferred because they are readily dispersed when added to base glasses in the forehearth. Of the alkali silicates, the silicate of sodium is most preferred.

Opalescent forehearth concentrates according to the invention comprise a non-smelted agglomerated interspersion of particles. In other words, the binder and glass component are not fused or smelted together, but rather they are formed into an agglomerated interspersion of particles by physical compression, which is otherwise known as cold compaction. The non-smelted agglomerated interspersion of particles, which are sometimes referred to as pellets, are non-dusting and easy to handle and meter into the base glass in the forehearth. The pellets can be formed into any size, but are preferably small to reduce the amount of time necessary for them to disperse into the molten base glass. Pellets generally having a size of about 2 mm to about 9.5 mm are preferred. Pellets can be formed using conventional cold compaction equipment and methods.

The present invention also provides a method for opalizing a molten base glass in a forehearth furnace. The method comprises the steps of: (i) providing an opalescent forehearth concentrate according to the invention; (ii) adding the opalescent forehearth concentrate to a molten base glass in a forehearth so as to impart opalescence to the molten base glass; and (iii) cooling the molten base glass to form a opalescent glass composition. The opalescent forehearth concentrates according to the invention are added as a particulate solid at a point in the forehearth other than in the base glass main melting tank. Ordinarily, the addition will most conveniently be made, on a continuous basis, to the pool of molten glass in the forehearth shortly after it issues from the main melting tank.

Where advantageous however, the method of this invention may be practiced as a batch process, with the opalescent forehearth concentrates being added to a melted base glass batch, or being added as a glass forming-opalizing ingredient to the normal glass forming batch composition prior to melting.

Distribution and dispersion of the opalescent forehearth concentrates according to the invention in the molten base glass may be accomplished by any suitable means, such as by introducing a stirring device into the pool of glass or by adding the opalescent forehearth concentrate while the base glass is being drawn and moved through a confined area such that flaw and slip within the glass produces a homogeneous mixture. The locus and manner of mixing will readily be selected by those skilled in the art and the particular method of addition will depend on the apparatus available.

The amount of opalescent concentrate to be added to the base glass will be determined by numerous parameters such as the quantum of molten base glass, its flow rate through the forehearth, the concentration of opalescent pigment in the concentrate, and the degree of opalizing desired in the final product. The proportions to be employed with any selected set of parameters can readily be ascertained by one having ordinary skill in the art of forehearth opalizing techniques. It is possible, by manipulating the concentration of opalescent pigment in the glass component and by manipulating the let-down ratio of the opalescent forehearth concentrate in the molten base glass, to produce a wide variety of desirable opalescent glasses.

The following examples are intended only to illustrate the invention and should not be construed as imposing limitations upon the claims.

EXAMPLES

To achieve the goals stated hereinabove, high fluorine-containing and high-melting salts such as aluminum fluoride $AlF_3$ (mp 1291° C., 67.9% fluorine) were chosen along with high-phosphate, and high-melting salts such as aluminum metaphosphate $Al(PO_3)_3$ (mp 1525° C., 35.2% phosphorus). To help flux the additional alumina added to the base soda lime silica glass to achieve a proper working viscosity low melting zinc borosilicate frits generally having a melting point in the range of 550° C. to about 700° C. were also added. It should be recognized that other high-melting and high-fluorine and/or high-phosphate containing compounds such as $CaF_2$ (mp 1423° C., 48.7% fluorine) and $AlPO_4$ (mp >1500° C., 25.4% phosphorus) and the like can be used. In addition other low melting frits or additives can be utilized to correct working viscosities. These low-melting frits and additives may include, for example, bismuth borosilicates, zinc borosilicates or zinc bismuth silicate frits, or combinations thereof. Tables 2 and 3 contain several formulations illustrating the opalescent forehearth concentrates herein.

TABLE 2

Opalescent forehearth concentrate formulations using $AlF_3$ and $Al(PO_3)_3$, a high-zinc, low silicate frit, and a high-zinc, high-silicate frit.

| Ingredient | Formula # | | | | |
|---|---|---|---|---|---|
| | 1 | 2 | 3 | 4 | 5 |
| | Weight percent | | | | |
| Frit A | 20 | | 20 | 30 | |
| Frit B | 20 | 25 | | 30 | 20 |
| ZnS | | 25 | | 10 | |
| $AlF_3$ | | | 40 | 5 | 40 |
| $Al(PO3)_3$ | | 50 | 40 | 10 | 40 |
| $Zn_2SiO_4$ seed | 60 | | | 15 | |
| total | 100 | 100 | 100 | 100 | 100 |

Glass Frits A and B have the formulations as shown in Table 3, below. ZnS is a zinc sulfide powder commercially available from Sachtleben Chemie GmbH, Duisburg, Germany. $AlF_3$, $Al(PO_3)_3$ and $Zn_2SiO_4$ seed material have been previously described herein. Several opalescent concentrates were formulated as shown Table 3.

TABLE 3

Opalescent forehearth concentrate compositions using $AlF_3$, $Al(PO_3)_3$, and a high-zinc, low silicate frit, on weight percent.

| Ingredient | Frit # | | | | | | | | | | |
|---|---|---|---|---|---|---|---|---|---|---|---|
| | 10 | 11 | 12 | 13 | 14 | 15 | 16 | 17 | 18 | 19 | 20 |
| | Weight percent | | | | | | | | | | |
| Frit A | 15.0 | 10.0 | 30.0 | 20.0 | 30.0 | 30.0 | 25.0 | 20.0 | 30.0 | 10.0 | 20.0 |
| $AlF_3$ | 47.5 | 40.0 | 60.0 | 30.0 | 20.0 | 60.0 | 32.5 | 60.0 | 40.0 | 60.0 | 52.5 |
| $Al(PO_3)_3$ | 37.5 | 50.0 | 10.0 | 50.0 | 50.0 | 10.0 | 42.5 | 20.0 | 30.0 | 30.0 | 27.5 |
| total | 100.0 | 100.0 | 100.0 | 100.0 | 100.0 | 100.0 | 100.0 | 100.0 | 100.0 | 100.0 | 100.0 |

Compositions of ingredients FS 256, NP 818 and 2099 seed are set forth in Table 4, in wt %, prior to firing.

TABLE 4

Frit and seed formulations as used in the Examples.

| Ingredient | Frit A | Frit B | $Zn_2SiO_4$ seed |
|---|---|---|---|
|  | Weight percent | | |
| $SiO_2$ | 19.1 | 38.3 | 27.0 |
| ZnO | 32.0 | 33.9 | 73.0 |
| $B_2O_3$ | 21.9 | 11.1 | |
| $Na_2O$ | 9.7 | 12.0 | |
| $TiO_2$ | 3.8 | 2.5 | |
| $Al_2O_3$ | 2.9 | | |
| $ZrO_2$ | 4.8 | | |
| $K_2O$ | 1.0 | | |
| $F_2$ | 4.8 | | |
| S | | | 2.2 |

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

The invention claimed is:

1. An opalescent forehearth color concentrate comprising a non-smelted agglomerated interspersion of particles for use in coloring glass, said concentrate comprising by weight from about 10% to about 70% of a glass component and from about 30% to about 90% of one or more opalescent pigments, wherein the opalescent pigments comprise at least one refractory metal salt comprising fluoride ions or phosphorous-containing ions, and wherein the glass component comprises by weight from about 10% to about 50% ZnO and about 15 to about 60% $SiO_2$.

2. An opalescent forehearth color concentrate comprising a non-smelted agglomerated interspersion of particles for use in coloring glass, said concentrate comprising by weight from about 10% to about 70% of a glass component and from about 30% to about 90% of one or more opalescent pigments, wherein the opalescent pigments are selected from the group consisting of $AlF_3$, $Al(PO_3)_3$, $AlPO_4$, $CaF_2$, $MgF_2$, $SrF_2$, $BaF_2$, NaF, KF, and RbF, and wherein the glass component comprises by weight from about 10% to about 50% ZnO and about 15 to about 60% $SiO_2$.

3. An opalescent forehearth color concentrate comprising a non-smelted agglomerated interspersion of particles for use in coloring glass, said concentrate comprising by weight from about 10% to about 70% of a glass component and from about 30% to about 90% of one or more opalescent pigments, wherein the opalescent pigments comprise at least one refractory metal salt comprising fluoride ions or phosphorous-containing ions, and wherein the glass component comprises
   a. about 10 wt % to about 60 wt % $SiO_2$,
   b. ZnO, provided the amount does not exceed about 50 wt %,
   c. $B_2O_3$, provided the amount does not exceed about 40 wt %,
   d. $Na_2O$, provided the amount does not exceed about 25 wt %,
   e. $TiO_2$, provided the amount does not exceed about 5 wt %,
   f. $Al_2O_3$, provided the amount does not exceed about 5 wt %,
   g. $ZrO_2$, provided the amount does not exceed about 8 wt %,
   h. $K_2O$, provided the amount does not exceed about 25 wt %, and
   i. $F_2$, provided the amount does not exceed about 15 wt %.

4. An opalescent forehearth color concentrate comprising a non-smelted agglomerated interspersion of particles for use in coloring glass, said concentrate comprising by weight from about 10% to about 70% of a glass component and from about 30% to about 90% of one or more opalescent pigments, wherein the glass component comprises:
   a. about 30 wt % to about 45 wt % $SiO_2$,
   b. about 15 wt % to about 40 wt % ZnO,
   c. about 4 wt % to about 18 wt % $B_2O_3$,
   d. about 8 wt % to about 22 wt % $Na_2O$,
   e. $TiO_2$, provided the amount does not exceed about 3 wt %,
   f. $Al_2O_3$, provided the amount does not exceed about 1 wt %,
   g. about 0.1 wt % to about 5 wt % $ZrO_2$,
   h. about 1 wt % to about 9 wt % $K_2O$, and
   i. about 0.1 wt % to about 5 wt % $F_2$.

5. An opalescent forehearth color concentrate comprising a non-smelted agglomerated interspersion of particles for use in coloring glass, said concentrate comprising by weight from about 10% to about 70% of a glass component and from about 30% to about 90% of one or more opalescent pigments, wherein the opalescent pigments comprise at least one refractory metal salt comprising fluoride ions or phosphorous-containing ions, wherein the glass component comprises:
   a. about 19 wt % to about 39 wt % $SiO_2$,
   b. about 32 wt % to about 34 wt % ZnO,
   c. about 11 wt % to about 22 wt % $B_2O_3$,
   d. about 9 wt % to about 12 wt % $Na_2O$,
   e. about 2 wt % to about 4 wt % $TiO_2$,
   f. $Al_2O_3$, provided the amount does not exceed about 3 wt %,
   g. $ZrO_2$, provided the amount does not exceed about 5 wt %,
   h. $K_2O$, provided the amount does not exceed about 1 wt %,
   i. $F_2$, provided the amount does not exceed about 5 wt %, and
   j. about 0.1 wt % to about 3 wt % S.

6. An opalescent forehearth color concentrate comprising:
   a non-smelted agglomerated interspersion of particles for use in coloring glass, said concentrate comprising:
      from about 10 wt % to about 70 wt % of a glass component and
      from about 30 wt % to about 90 wt % of one or more opalescent pigments,
         the glass component comprising by weight from about 10 wt % to about 50 wt % ZnO and about 15 wt % to about 60 wt % $SiO_2$, and further comprising a crystalline seed material selected from the group consisting of bismuth borosilicates, bismuth silicates, bismuth titanates, calcium silicates, zinc borosilicates, and zinc silicates.

7. An opalescent forehearth color concentrate comprising:
   a non-smelted agglomerated interspersion of particles for use in coloring glass, said concentrate comprising:
      from about 10 wt % to about 70 wt % of a glass component and from about 30 wt % to about 90 wt % of one or more opalescent pigments, the glass component comprising by weight from about 10 wt % to about 50 wt % ZnO and about 15 wt % to about 60 wt % $SiO_2$, and further comprising a binder selected from the group consisting of alkali borates, boric acid, alkali phosphates, orthophosphoric acid, alkali silicates, fluorosilicic acid, alkali fluorides, alkali salts, alkali hydroxides and combinations thereof.

8. An opalescent forehearth color concentrate comprising a non-smelted agglomerated interspersion of particles for use in coloring glass, said concentrate comprising by weight from about 10% to about 70% of a glass component and from about 30% to about 90% of one or more opalescent pigments, wherein the glass component comprises:
 a. a first frit, wherein the first frit comprises
  i. about 30 wt % to about 45 wt % $SiO_2$,
  ii. about 15 wt % to about 40 wt % ZnO,
  iii. about 4 wt % to about 18 wt % $B_2O_3$,
  iv. about 8 wt % to about 22 wt % $Na_2O$,
  v. $TiO_2$, provided the amount does not exceed about 3 wt %,
  vi. $Al_2O_3$, provided the amount does not exceed about 1 wt %,
  vii. about 0.1 wt % to about 5 wt % $ZrO_2$,
  viii. about 1 wt % to about 9 wt % $K_2O$, and
  ix. about 0.1 wt % to about 5 wt % $F_2$, and,
 b. a second frit, wherein the second frit comprises
  i. about 19 wt % to about 39 wt % $SiO_2$,
  ii. about 32 wt % to about 34 wt % ZnO,
  iii. about 11 wt % to about 22 wt % $B_2O_3$,
  iv. about 9 wt % to about 12 wt % $Na_2O$,
  v. about 2 wt % to about 4 wt % $TiO_2$,
  vi. $Al_2O_3$, provided the amount does not exceed about 3 wt %,
  vii. $ZrO_2$, provided the amount does not exceed about 5 wt %,
  viii. $K_2O$, provided the amount does not exceed about 1 wt %,
  ix. $F_2$, provided the amount does not exceed about 5 wt %, and
  x. about 0.1 wt % to about 3 wt % S.

9. An opalescent forehearth color concentrate comprising:
a non-smelted agglomerated interspersion of particles for use in coloring glass, said concentrate comprising: from about 30 wt % to about 90 wt % of one or more opalescent pigments, and from about 10 wt % to about 70 wt % of a glass component and the glass component comprising by weight
 from about 10 wt % to about 50 wt % ZnO and about 15 wt % to about 60 wt % $SiO_2$, and
 further comprising a crystalline seed material selected from the group consisting of $Zn_2SiO_4$, $Bi_{12}SiO_{20}$, $Bi_4(SiO_4)_3$, $Bi_2SiO_5$, $2ZnO.3TiO_2$, $Bi_2O_3.SiO_2$, $Bi_2O_3.2TiO_2$, $2Bi_2O_3.3TiO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, and $Bi_2Ti_4O_{11}$.

* * * * *